United States Patent [19] [11] 3,715,667
Nicolson [45] Feb. 6, 1973

[54] NON-DESTRUCTIVE ELECTROMAGNETIC ENERGY TESTING OF WEB MATERIAL

[75] Inventor: Alexander M. Nicolson, Concord, Mass.

[73] Assignee: Sperry Rand Corporation, New York, N.Y.

[22] Filed: Oct. 4, 1971

[21] Appl. No.: 186,213

[52] U.S. Cl. ............................................ 324/58.5 B
[51] Int. Cl. ............................................. G01r 27/04
[58] Field of Search ..................... 324/58.5 B, 58.5 R

[56] References Cited

UNITED STATES PATENTS 3,026,415  3/1962  Lake, Jr. et al. .................. 324/58.5 B
3,144,601  8/1964  Slabodsky ........................ 324/58.5 B
3,364,421  1/1968  Bullwinkel ................... 324/58.5 B X

OTHER PUBLICATIONS

Summerhill, Microwaves As An Industrial Tool, Measurement and Instrument Review, February 1969, pp 79–81.

*Primary Examiner*—Stanley T. Krawczewicz
*Attorney*—H. P. Terry

[57] ABSTRACT

The forward or back scattered high frequency energy from a moving web of dielectric material exposed to incident impulses of base band duration electromagnetic energy in a parallel plate transmission line is continuously monitored by a signal sampling and comparison system for providing defect-stimulated alarm or control signals.

13 Claims, 7 Drawing Figures

INVENTOR
ALEXANDER M. NICOLSON
BY
ATTORNEY

INVENTOR
ALEXANDER M. NICOLSON
BY
H P Ferry
ATTORNEY

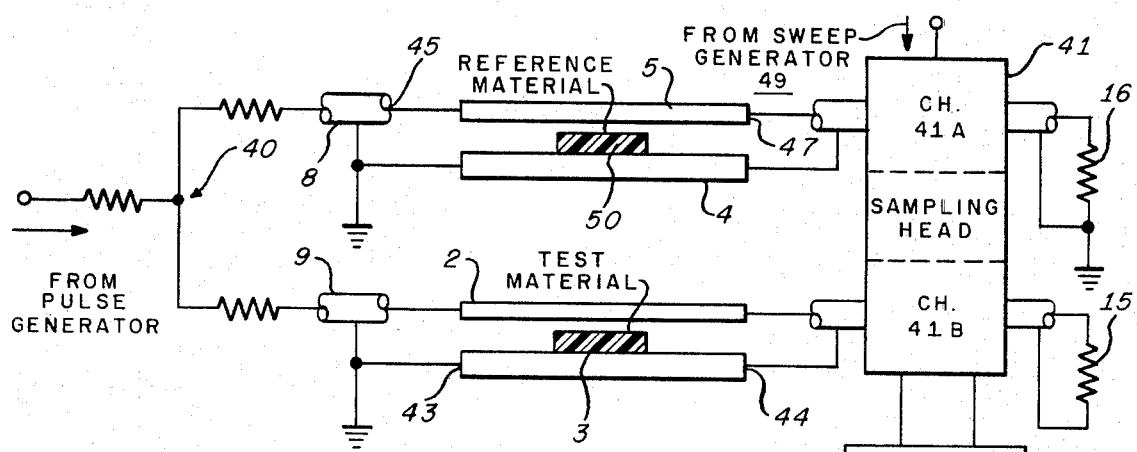
FIG.5.
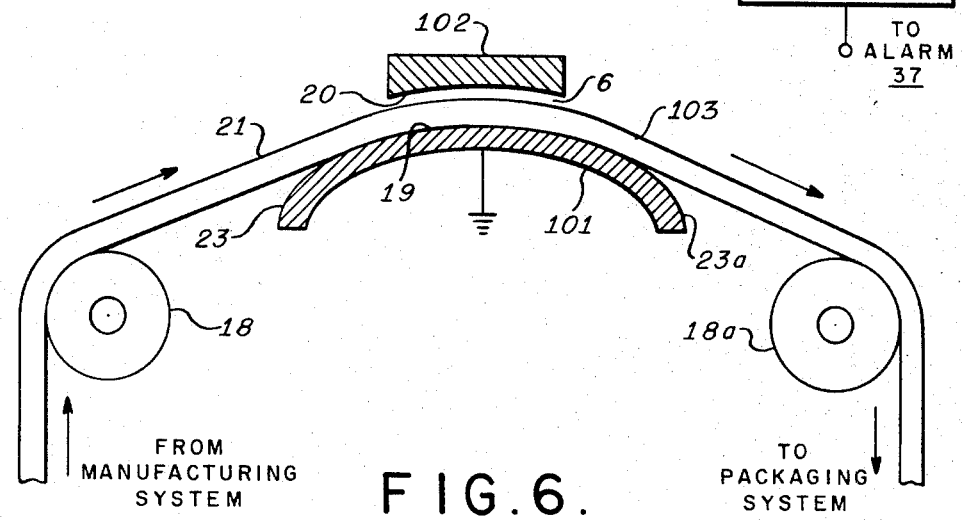
FIG.6.
FIG.7.
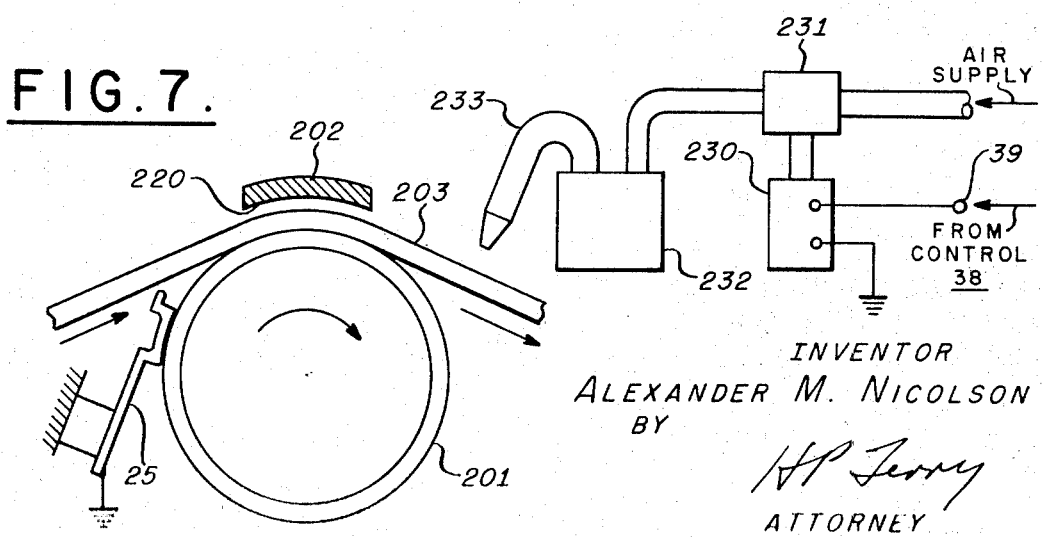
INVENTOR
ALEXANDER M. NICOLSON
BY
*HP Ferry*
ATTORNEY

NON-DESTRUCTIVE ELECTROMAGNETIC ENERGY TESTING OF WEB MATERIAL

BACKGROUND OF THE INVENTION

1. Field of the Invention

The invention pertains to apparatus for monitoring the high frequency time-domain characteristics of dielectric materials and more specifically concerns high frequency transmission line apparatus for the rapid and accurate monitoring of the time domain properties of rapidly moving web-shaped dielectric materials for the purpose of non-destructive testing of such materials as part of a manufacturing process, for example.

2. Description of the Prior Art

Various kinds of microwave interferometric and other apparatus have been employed in the past for the non-destructive detection of flaws in materials, including apparatus permitting continuous monitoring of dielectric material as it flows past a monitor in a manufacturing process. Reflection or standing wave techniques and energy scattering principles have both been employed with a degree of success in the detection of voids, split apart laminations, macroporosity, inclusions of foreign material, and of other types of flaws in many plastic, ceramic, and other materials.

The known procedures have involved tests at one microwave frequency as a matter of convenience, and therefore do not generally give reliable results where a wide variety of sizes and types of flaws is to be expected. The sensitivity of such microwave testing also depended, to a large degree, on the test frequency employed, generally increasing with that test frequency. For example, the scattering cross section for a void of given size varies rapidly as a function of the test frequency.

It is seen that such prior art test systems lack utility where flaws having a wide range of characteristics must be detected. Further, such arrangements have no means for discrimination against false operation caused by any change in the immediate environment of the test apparatus. Having no such discriminative properties, the presence or movement of nearby personnel or tools or other objects may cause an alarm falsely indicating detection of a defect or may even prevent a proper alarm in the presence of an actual flaw. Prior art systems have not lent themselves to making rapid tests of the electrical characteristics of a rapidly moving web of dielectric materials such as may include a variety of defects widely differing in size and in dielectric character with respect to the desired dielectric character of the web material. To achieve useful responses to such widely differing defects, a wide range of frequencies would be required as test signals if conventional frequency domain approaches were to be used. An entirely new approach to the problem has long been needed, one which can with facility provide signals of a wide range of characteristics suitable for instantaneous and rapid response to the wide range of defects that may be present in dielectric material being continuously inspected.

SUMMARY OF THE INVENTION

The present invention is a high frequency or microwave impulse system permitting the accurate monitoring of rapidly moving dielectric materials in web form for a wide range of sizes and types of possible defects. The forward or back scattered base-band electromagnetic pulse energy from a rapidly moving web of dielectric material is observed, the web being exposed to incident base band pulses in a parallel plate transmission line system across which the web flows. A signal sampling and comparison system provides alarm or control signals when a defect is encountered.

BRIEF DESCRIPTION OF THE DRAWINGS

FIG. 5 is a second alternative form of the apparatus of FIG. 2.

FIGS. 6 and 7 illustrate alternate forms of the transmission line apparatus of FIG. 1.

DESCRIPTION OF THE PREFERRED EMBODIMENTS

Figure 1:
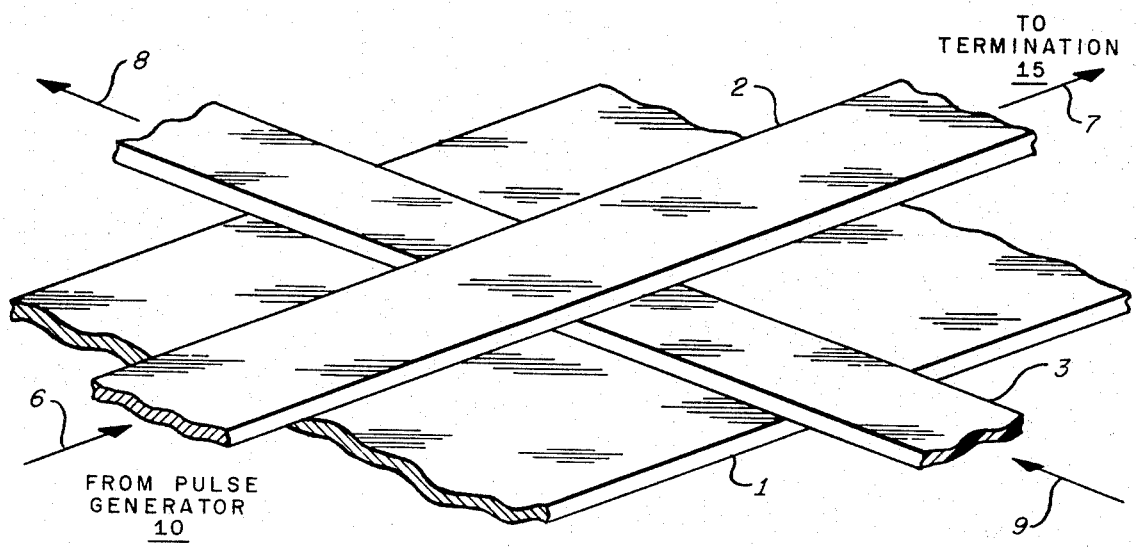
FIG. 1 is a perspective view of the monitoring transmission line system of the invention.
Figure 2:
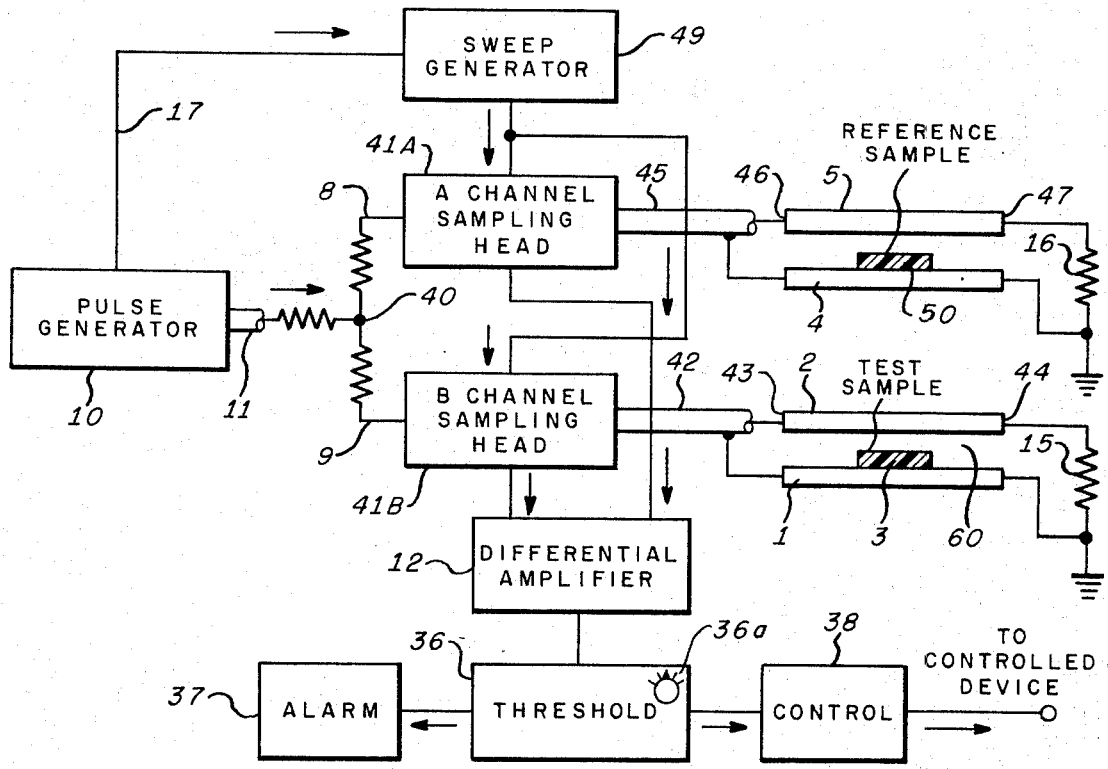
FIG. 2 is an electrical circuit diagram of the invention, showing how novel operating electrical equipment is connected to the device of FIG. 1.

The novel time domain measurement apparatus shown in FIGS. 1 and 2 permits accurate investigation of undesirable defects or flaws, such as gas bubbles, cracks, or inclusions of foreign matter, particularly in dielectric material such as is formed or handled in the shape of a thin strip or a continuous web. Such defects are detected, according to the invention, by exposing the dielectric strip or web to short or base band pulses of electromagnetic energy and by using a corresponding forward or back scattered response of the material of the web to provide time domain detection of the presence of defects. Comparison of such a response to a previously stored or reference response signal characterizing defect-free material may be employed to generate an alarm or control signal, as will be seen.

In FIGS. 1 and 2, parts of a generally planar transmission line system capable of transverse electromagnetic or TEM mode operation are illustrated, including a base or ground plane conductor 1 and a strip transmission line conductor 2 overlying ground plane conductor 1 and separated from it by a preferably constant gap 60. The conductors 1 and 2 are preferably constituted of a material such that the surface of strip line conductor 2 and particularly the surface of ground plane conductor 1 facing strip line conductor 2 have high electrical conductivity characteristics for propagating high or microwave frequency electromagnetic energy in the dispersionless TEM propagation mode. The gap 60 between conductors 1 and 2 may be maintained in any of the conventional ways employed extensively in the prior transmission line art. The strip 3, directed substantially at right angles to the direction represented by arrows 6, 7 of electromagnetic energy propagation within transmission line 1, 2, may be a strip or continuous web of dielectric material moved in the direction of arrows 8, 9. Web 3 may be continuous or discontinuous, and its point of passage through transmission line 1, 2 may be held relatively fixed by known mechanical elements or by automatic apparatus such as is found in the prior servo mechanism art for positioning the edge of a moving web at a substantially fixed location. If flexible, the web 3 may be controlled by known prior art constant tension apparatus, so that its aspect in passing through transmission line 1, 2 is held substantially constant.

In FIG. 2, one form of the basic apparatus for developing signals indicative of the presence of a defect in web 3 is shown, along with certain novel control and signal processing elements later to be discussed in further detail. The principal apparatus for developing defect-indicating signals includes the short duration or base band pulse generator 10, which generator is coupled by coaxial transmission line 11 to a conventional resistive matched triple-port coaxial power divider 40. The output ports 8 and 9 of divider 40 are respectively coupled to the inputs of A channel sampling head 41A and of B channel sampling head 41B. It will be understood by those skilled in the art that the sampling head channels as well as sweep generator 49 may be conventional elements of a conventional sampling oscilloscope.

Sampling head channel 41B has an output coupled by coaxial line 42 to one end junction 43 of a planar transmission line such as line 1, 2 of FIG. 1. Well known broad band impedance matching TEM transformer means (not shown) may be used at junction 43 for substantially eliminating impedance mismatch at junction 43. Likewise, a similar known broad band TEM impedance matching transformer means (not shown) may similarly be employed at the opposite end junction 44 of transmission line 1, 2 for the purpose of joining the latter to a conventional matched termination 15. Termination 15 may conveniently take the form of a conventional matched coaxial or strip transmission line termination for absorbing all energy impingent upon it. The A channel 41A of the sampling head is connected by coaxial line 45 to end junction 46 of a second planar transmission line 4, 5 similar to transmission 1, 2, which line 4, 5 is terminated at end junction 47 by a termination 16 similar to termination 15. The planar transmission line systems 1, 2 and 4, 5 are substantially similar as also are the respective input connections 42 and 45 and the respective terminations 15 and 16. The web 3 to be tested continuously passes through planar transmission line 1, 2. On the other hand, a perfect reference sample 50 of the web material may be fixed within the planar transmission line 4, 5.

Pulse generator 10 is a device for producing a train of output base-band duration impulses, typically having rise times, for example, of the order of 100 picoseconds. Pulse generator 10 may be a conventional synchronizable pulse source available on the market for the generation of fast rise time impulses, or such as may employ a solenoid-driven mercury switch of the kind described in the G.F. Ross et al U.S. Pat. application No. 843,945, filed July 23, 1969 for a "High Frequency Switch" and issued Mar. 9, 1971 as U.S. Pat. No. 3,569,877, or in the H.C. Maguire U.S. Pat. application No. 852,656 filed Aug. 25, 1969 for a "Coaxial Line Reed Switch Fast Rise Time Signal Generator with Attenuation Means Forming Outer Section of Line," issued Feb. 16, 1971 as U.S. Pat. No. 3,564,277. Both patents are assigned to the Sperry Rand Corporation. The sampling head 41A and 41B devices are of the type usually employed in conventional sampling oscilloscopes for the study of the impulse properties of high frequency circuits, such as may be employed with the sampling oscilloscope of the A.M. Nicolson U.S. Pat. application Ser. No. 844,021 for a "Method and Means for Compensating Amplitude and Time Drifts in Sampling Wave Form Systems," filed July 23, 1969, assigned to the Sperry Rand Corporation, and issued June 8, 1971 as U.S. Pat. No. 3,584,309. The use of such improved sampling heads and sampling oscilloscopes for the measurement of the complex high frequency permittivity and permeability of materials is further considered in the A.M. Nicholson et al. U.S. Pat. application Ser. No. 99,948, entitled, "Time Domain Measurement of Complex Permittivity and Permeability," filed Dec. 21, 1970 and assigned to the Sperry Rand Corporation. It is understood that sweep generator 49 is controlled via lead 17 so that it operates in synchronism with pulse generator 10.

In the apparatus of FIGS. 1 and 2, a train of sub-nanosecond pulses formed by generator 10 passes through power divider 40 and channel 41B of the sampling head and enters the planar transmission line 1, 2. In the system of FIG. 2, the energy of the pulses is considered to be transmitted in small extent through the normal web or strip 3 and is then absorbed in matched termination 15. A major portion of each propagating impulse is reflected by web 3, is sampled by sampling head 41B, and enters power divider 40. Here, it is partially transmitted to pulse generator 10 where it is fully absorbed, and partially transmitted to the other channel 41A of the sampling head system. The time taken for the reflected pulse to travel through power divider 40 and to enter channel 41A may be assumed to be sufficiently long that the pulse then occurs outside the time window scanned by sampling head 41A. Both channels 41A and 41B are caused to scan the same time window by the saw tooth scan voltage generator 49 which, as noted above, may be an integral part of the sampling oscilloscope. In exactly the same manner as heretofore described, a second portion of each original pulse from pulse generator 10 propagates through the channel 41A of the sampling head system and through coaxial line 45 to termination 16 on planar transmission line 4, 5. Here, a major portion of the pulse energy is reflected by reference web 50, and the reflected pulse is sampled by the channel 41A of the sampling head. The sampling heads 41A, 41B take samples at successive times of the wave forms on both channels, and the difference voltage between these two samples is derived by differential amplifier 12 or by other subtraction means.

The differential voltage is therefore made available in time-stretched form, as in conventional sampling oscilloscopes, at the input of threshold circuit 36. Threshold circuit 36 is adjusted as by adjustment 36a in a conventional manner, the setting of adjustment 36a being determined by the tolerable level of false alarms to be registered by alarm 37. Alarm 37 may be a latching or other conventional alarm device. If desired, a version of the output signal of threshold circuit 36 may be applied to a control device 38 for purposes which remain to be discussed. It is seen that the system of FIG. 2 is of particular interest where the web or strip 3 is composed of a relatively high dielectric constant material.

Figure 3:
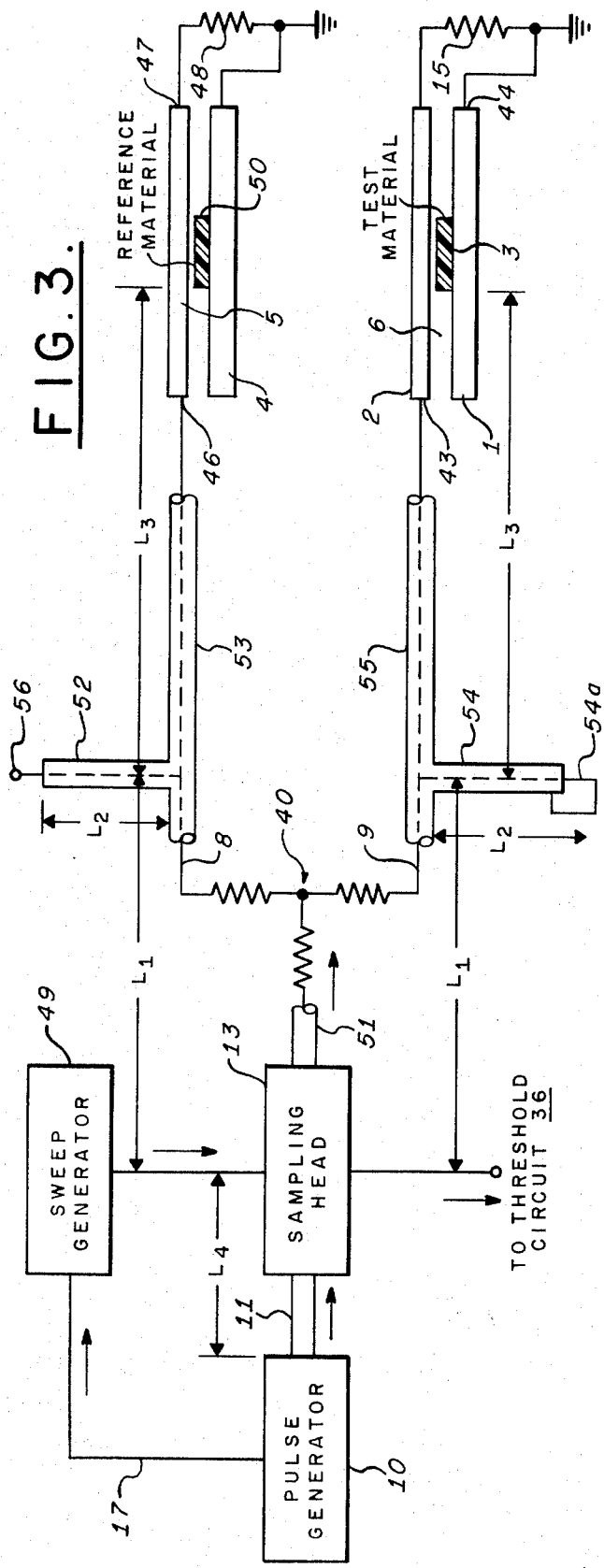
FIG. 3 is a first alternative form of the apparatus of FIG. 2.
Figure 4:
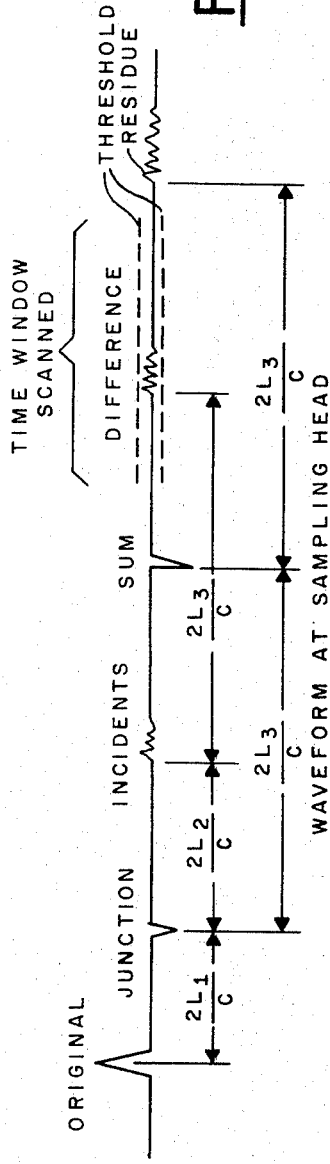
FIG. 4 is a graph of wave forms useful in understanding the apparatus of FIG. 3.

An alternative system which uses only a single channel sampling system is presented in FIG. 3. Pulse generator 10 is connected through coaxial line 11 to single channel sampling head 13, which head scans as in the system of FIG. 3 under the control of saw tooth scan voltage generator 49 operated synchronously with pulse generator 10. The pulse leaves the head 13 through coaxial line 51 and enters triple-port power divider 40. From output port 9, one portion of the pulse enters coaxial line 55 which connects at its opposite end through junction 43 to a planar transmission line 1,2, containing the web material 3 under test. Coaxial line 55 also includes a shunt coaxial stub 54, which at its outer end is terminated in a short-circuit 54a. Line 54 has a characteristic impedance which is preferably one-half that of coaxial line 55. The other output port 8 of divider 40 connects to a coaxial transmission line 53 whose opposite end is connected to junction 46 of planar transmission line 4, 5. Coaxial line 53 also includes shunt stub 52, which at its outer end is terminated in an open-circuit at location 56. Line 52 has a characteristic impedance which is preferably one-half that of coaxial line 53. Planar line 1, 2 contains the web material 3 being tested, while planar line 4, 5 contains the reference web material 50. The electrical lengths $L_2$ of stubs 52 and 54 are preferably one-half the electrical lengths $L_3$ from the bases of the stubs through coaxial lines 53 and 55 to the respective web materials 50 and 3. It will be seen that the stubs 52 and 54 serve the purpose of generating positive and negative replicas, respectively, of the incident pulse from generator 10, and that portions of these replicas will reflect from web materials 50 and 3 and will return to the sampling head 13. If materials 50 and 3 are identical in their dielectric properties, lengths $L_1$, $L_2$, and $L_3$ having been appropriately adjusted, the two responses will exactly cancel over a certain region of time. As seen in the graph of FIG. 4, this desirable time window is achieved by appropriate choice of $L_1$, $L_2$, and $L_3$. It will be appreciated that other means, such as broad-band pulse transformers, may be used to generate the positive and negative replicas produced by stubs 52 and 54.

For testing or monitoring relatively low dielectric constant materials, the system of FIG. 5 may be preferred. In FIG. 5, the dual channel sampling head 41 is series connected following planar transmission lines 1,2 and 4,5 and has its output terminals connected directly to the respective matched terminations 15 and 16. The difference signals between the two sampled wave forms is passed to the threshold circuit 36, as before in FIG. 2. Similarly, a transmission version of the system of FIG. 3 may readily be envisioned by those skilled in the art, in which a single-channel sampling head is used and open and shorted circuit branch stubs generate positive and negative replicas of the incident wave form.

According to other embodiments of the invention, the planar conductors 1, 2 of the transmission line of FIG. 1 need not actually be strictly flat planes, but may be arranged in other convenient configurations, such as in FIGS. 6 and 7. The devices of FIGS. 6 and 7 have certain advantages, including means for reducing or substantially eliminating friction between the moving web 3 with respect to the ground plane conductor 1 and strip transmission line 2 of FIG. 1.

As seen in FIG. 6, the web 103 moves over free drum or pulley 18 after having passed through various manufacturing or processing stations (not shown) and then through arcuate transmission line 101, 102 and out over free drum or pulley 18a to product reeling or other packaging apparatus (not shown). Grounded arcuate conductor 101 has a generally cylindrical conductive inner surface 19, while strip transmission line conductor 102 has a generally conformal inner conducting surface 20 of substantially similar curvature so that web 103 may readily be passed between surfaces 19, 20, the gap 6 between surfaces 19, 20 being substantially constant. While surface 20 may actually contact the upper surface 21 of web 103, such is not necessary. In fact, to reduce possible wear of surface 20, actual contact may be avoided so that the gap 6 between surfaces 19, 20 remain substantially constant over an extended period of use. Lack of contact also removes any significant mechanism for building up an undesirable electrostatic charge on strip line conductor 102. It is seen that the web 103 comes gently into contact at the increasingly curved portion 23 of conductor 101 and similarly leaves the region of transmission line 101, 102 at curved portion 23a. If desired, the surface 19 of conductor 101 may be supplied with a thin film of lubricant compatible with the materials of the surface 19 and of the web or strip 103.

In the further alternative embodiment of FIG. 7, the upper or strip transmission line conductor 202 is generally similar to conductor 102 of FIG. 6, having an inner curved surface 220 generally conformal to the shape of web 203 in its vicinity. In this instance, however, the grounded arcuate conductor 101 of FIG. 6 is replaced by a free or driven drum or pulley 201 whose surface is at ground potential by virtue of the grounded connection of slip ring brush 25. It is understood that the respective arcuate conductors 101 and 201 of FIGS. 6 and 7 are arranged to be at the same potential as the outer conductor of the coaxial transmission line 42 for instance. It will be further understood that the strip conductors 102 and 202 may readily be connected through matched impedance transformers to the center conductors or cooperating coaxial transmission lines in a manner analogous to the connections at junctions 43, 44 in FIGS. 2, 3, and 5.

In the time domain mode of operation of the system of FIG. 2, for example, the event which causes a change in the output of the sampling head system is the passage of a flaw in the moving web 3; i.e., the pulse reflected by or transmitted through web 3 will change in character because of the passage of a defect. In the systems of FIGS. 2 and 3, a comparison is made between this reflected or transmitted pulse from web 3 and a reference signal characteristic of a perfect transmitted pulse from web 3 and a reference signal characteristic of a perfect web.

In each illustrated system, the sampling head system is caused to sample the wave form on its channel or channels, one such sample occurring for each pulse from the pulse generator 10. The sampling position on the wave form moves incrementally across a time window at a rate determined by the saw tooth scan voltage generator 49 and by pulse generator 10, and at the end of the time window of interest abruptly returns to the beginning position in the time window and repeats the process. In the two-channel systems of FIGS. 2 and 5, a wave form is produced at the output of differential amplifier 12 which is a sampled-and-held time-stretched replica of the difference between the two wave forms passing through the channels 41A and 41B. In the single channel system of FIG. 3, a wave form is produced at the output of sampling head 13 which is a sampled-and-held time-stretched replica of the wave form entering the head from transmission line 51.

In either case, it is seen that the output wave form will be the difference in the response of the web 3 under test and of the reference web 50. This difference is achieved by subtracting one sampled wave form from the other, as in FIGS. 2 and 5, or by summing the response of the two webs to identical pulses of opposite polarity, as in FIG. 3. In either case, the wave form produced from the sampling head system will ideally be a null voltage, any excursions from a flat base line representing a difference between the two webs. Signals that exceed a predetermined difference voltage either in the positive or negative sense are detected by the threshold circuit 36 and the detected result may be passed to utilization equipment. The latter may comprise an alarm 37 in the form of a visible or audible alarm generator. On the other hand, the alarm control signal may be applied to a control device 38 for operation of a mechanism for marking or discarding a defective reel. A defective portion of the web 203 of FIG. 7, for instance, may be marked by paint supplied from the reservoir 232 through paint spray nozzle 233 when air under pressure is supplied to the reservoir 232 upon the opening of a valve 231 when a solenoid 230 is actuated by the control signal from control 38. The nozzle 233 may be arranged to indicate the presence of a defect in a given reel by aiming paint at the final packaging reel itself.

It will be recognized by those skilled in the art that known signal processing arrangements may alternatively be used to correlate the values of defect signals reflected or otherwise scattered from web 3 with reference to digital or analog stored standard data. In a well-known manner, the amplitude at specific time positions of the wave form reflected from or transmitted through reference web 50 may be momentarily stored as a reference amplitude, and then compared in amplitude to the corresponding signal reflected or scattered by a deficiency in web 3. It is clear that such stored pulse signals may be automatically erased after the comparison event, readying the storage device for the receipt of a succeeding pulse from generator 10 for accomplishing a succeeding comparison. Other well known arrangements for storage of such reference pulses and for their comparison with reflected signals indicating web defects may readily be employed. It will be further understood that a signal processor system, such as illustrated in FIGS. 2, 3, and 5 may be augmented in performance through the additional use of other base band pulse or time domain measurement equipment such as that disclosed in the aforementioned U.S. patent application Ser. No. 99,948. Such apparatus permits simultaneous display on a sampling oscilloscope of a wave form with representations of the incident impulse and its back and forward scattered time domain signatures, the latter being uniquely related to the intrinsic properties of the material under examination.

While the invention has been described in its preferred embodiments, it is to be understood that the words which have been used are words of description rather than of limitation and that changes within the purview of the appended claims may be made without departing from the true scope and spirit of the invention in its broader aspects.

I claim:

1. High frequency apparatus for monitoring the intrinsic dielectric properties of a moving web of material comprising:
    transmission line means for propagating base band electromagnetic pulses in the transverse electromagnetic propagation mode having first and second spaced, substantially parallel conductors,
    means for passing said web of material between said conductors substantially perpendicular to the direction of electromagnetic energy propagation therein,
    base band pulse generator means for exciting said transmission line means,
    matched transmission line termination means,
    sampling means connected in series relation between said base band pulse generator means and said matched transmission line termination means and responsive to energy scattered by said web to form a signal representative of said scattered energy,
    means for comparing said signal representative of said scattered energy to a reference signal for forming an output signal upon the departure of the level of scattered energy from a normal value, and
    utilization means responsive to said comparing means.

2. Apparatus as described in claim 1 wherein said first conductor comprises strip transmission line means having a first surface with a first transverse dimension and said second conductor comprises ground plane means having a second surface with a transverse dimension greater than said first dimension.

3. Apparatus as described in claim 2 wherein said first and second surfaces are generally conformal, and said web is passed between said surfaces in substantial conformal relation therewith.

4. Apparatus as described in claim 3 wherein said first and second surfaces are arcuate.

5. Apparatus as described in claim 4 wherein said second surface comprises the surface of a drum rotatable synchronously with the motion of said web.

6. Apparatus as described in claim 1 additionally comprising means for operating said sampling means in synchronism with said pulse generator means.

7. Apparatus as described in claim 6 additionally including threshold means serially connected between said comparing means and said utilization means.

8. Apparatus as described in claim 2 wherein said utilization means comprises alarm means.

9. Apparatus as described in claim 2 wherein said utilization means comprises means for demarking defective web material upon the departure of the level of said scattered energy from a normal value.

10. Apparatus as described in claim 1 additionally including reference signal source means comprising transmission line means for propagating base band electromagnetic pulses in the transverse electromagnetic mode and having first and second spaced conductors.

11. Apparatus as described in claim 10 wherein said reference signal source transmission line means is adapted fixedly to support a reference sample of said web.

12. Apparatus as described in claim 11 wherein said base band pulse generator is adapted to excite said reference signal source transmission line means.

13. Apparatus as described in claim 12 additionally including reference sampling means connected in series relation with said base band pulse generator means and said reference transmission line means for generating said reference signal for comparison to said signal representative of said scattered energy.

* * * * *